US005248977A

United States Patent [19]

Lee et al.

[11] Patent Number: 5,248,977

[45] Date of Patent: Sep. 28, 1993

[54] ONE-DIMENSIONAL ELECTRONIC IMAGE SCANNER

[75] Inventors: Paul S. C. Lee, La Palma; John D. O'Keefe, Manhattan Beach, both of Calif.

[73] Assignee: TRW Inc., Redondo Beach, Calif.

[21] Appl. No.: 891,972

[22] Filed: May 26, 1992

[51] Int. Cl.[5] .......... G01S 13/89

[52] U.S. Cl. .......... 342/25; 342/179; 342/175

[58] Field of Search .......... 342/25, 55, 179, 197, 342/175

[56] References Cited

U.S. PATENT DOCUMENTS

| | | | |
|---|---|---|---|
| 3,824,593 | 7/1974 | Baird | 342/179 |
| 3,904,272 | 9/1975 | Straka | 359/254 |
| 4,552,151 | 11/1985 | Bolomey et al. | 343/754 X |
| 4,940,303 | 7/1990 | Abeles et al. | 372/24 X |
| 5,009,477 | 4/1991 | Alferness et al. | 350/370 X |
| 5,078,468 | 1/1992 | Stone | 385/116 |
| 5,121,124 | 6/1992 | Spivey et al. | 342/179 |
| 5,128,621 | 7/1992 | Berthaud et al. | 324/639 |
| 5,170,169 | 12/1992 | Stephan | 342/179 |

*Primary Examiner*—John B. Sotomayor
*Attorney, Agent, or Firm*—Sol L. Goldstein

[57] ABSTRACT

A microwave image scanning apparatus which utilizes a dispersive waveguide wedge in front of a microwave sensor. Similar to an optical prism, the waveguide wedge resolves multi-spectral microwave energy from various directions into the same direction for detection by the microwave sensor and subsequent formation of a refined high quality video image. The waveguide wedge consists of a collection of waveguide channels having their longitudinal axes aligned substantially in parallel.

18 Claims, 2 Drawing Sheets

ONE-DIMENSIONAL ELECTRONIC IMAGE SCANNER

BACKGROUND OF THE INVENTION

1. Technical Field

The present invention relates generally to electronic imaging technology and, more particularly, to a one-dimensional microwave or millimeter wave image scanning apparatus. The apparatus of the present invention is especially well-suited for geographic imaging applications such as generating real-time video pictures of a landing strip for an airplane or of the surface of the ocean in search of oil contamination.

2. Discussion

Various types of imaging systems have been developed for use in conjunction with geographic imaging applications, with radar systems being one of the most popular. Radar and similar imaging technologies operate by transmitting a radiowave signal towards a target and then detecting a return signal reflected back from the target. The return signals and the rate at which they return are used to generate information about the target and its location. These systems, however, innately experience difficulties in attaining geographic images in various adverse environmental conditions such as snow, rain, dust or fog.

Utilizing millimeter wave or microwave energy has provided a viable alternative and presents various advantages over use of other signal types. As microwave or millimeter wave energy is naturally present in the environment and is reflected to some degree off of most objects, it is possible to obtain a video image or picture passively, without having to transmit an excitation signal and without necessitating a return signal response. Also, microwave or millimeter wave energy is not substantially attenuated by atmospheric moisture such as fog, snow or rain and millimeter waves penetrate adverse environmental conditions such as smoke and dust clouds wherein suspended particles are of less than a millimeter in size. Due to shorter wavelengths, millimeter wave systems can be physically implemented with relatively small antennas, useful in applications where small antennas are particularly advantageous such as on an airplane.

Such millimeter wave imaging devices conventionally employ a two dimensional focal plane array wherein a lens or other focusing element is used to focus millimeter wave radiation obtained from the field of view onto the array. Each focal plane element in the array receives a microwave signal and converts the radiation incident thereon into an electrical output signal used to drive a video display of the image. Each output signal generated by an array element is most often mapped to one image element.

With such conventional systems, however, the resulting video picture produced may appear ragged or coarse due to discrete pixelization and image undersampling. Each pixel of the displayed image represents radiation from the portion of the image radiated in a direction directly incident on a given detector. Since there are practical physical limitations on the number of and spacing between focal plane elements in the array structure, some of the image information may be lost, especially that not corresponding to a central portion of a detector element. This not only causes greatly degraded image quality but also leads to the exclusion of many image enhancement techniques. More accurate information would be obtainable if some of the direct radiation corresponding to peripheral regions of the detector could be directed toward the center. While various mechanical scanning methods have been used to alleviate such difficulties, the speed at which the mechanical scanner has to operate limits the practical application of such techniques.

In view of the above, there is a need for an improved imaging system which utilizes energy in the millimeter wave or microwave spectrum to produce a refined high quality video picture for which various image enhancement techniques are available. It is also desirable that such systems have no mechanical moving parts to reduce overall system complexity and to improve reliability.

SUMMARY OF THE INVENTION

The imaging system of the present invention provides unidirectional image oversampling in the form of an electronic scanning action by utilizing a dispersive waveguide wedge in front of a microwave focal plane sensor array. The waveguide wedge, generally formed by a collection of aligned waveguide channels, will operate like an optical prism to refract multi-spectral microwave energy from various directions into the same direction for detection by the sensor array and subsequent formation of a video image of the target.

This unique system produces a very high quality video image while allowing a reduction in the number of focal plane elements in the focal plane array. The image produced is of a quality to allow use of sophisticated image enhancement techniques often precluded with more conventional systems. Since there are no moving parts in the system, problems inherent with devices utilizing mechanical scanning means are eliminated and increased reliability results.

Additional objects, advantages and features of the present invention will become apparent from the following description and amended claims, taken in conjunction with the accompanying drawings.

Figure 1:
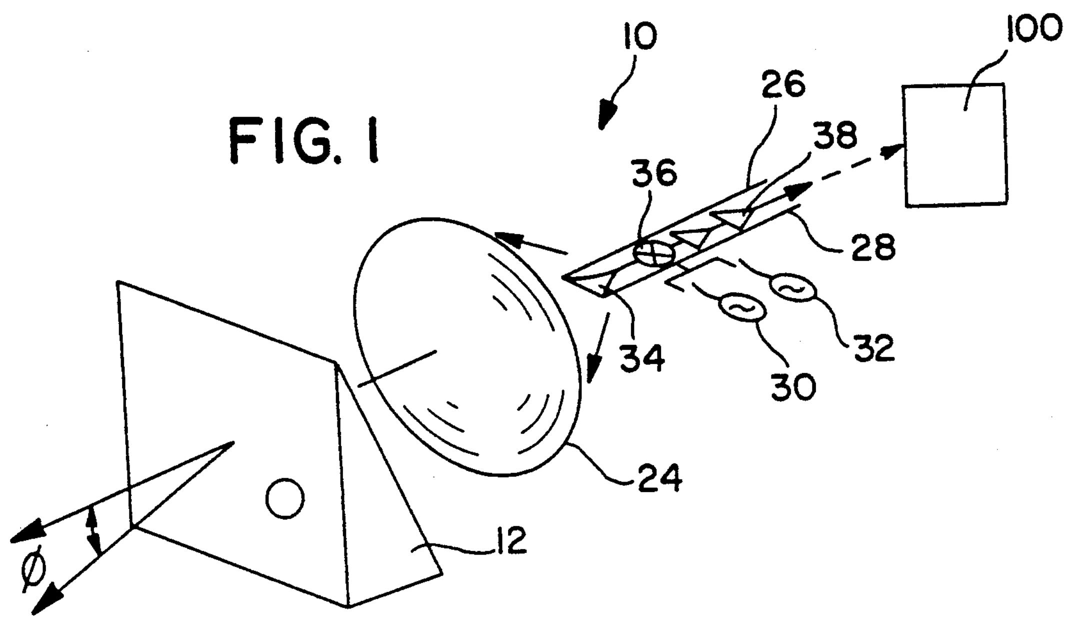
FIG. 1 is a schematic diagram of an image scanning apparatus according to the teachings of the present invention.
Figure 1A:
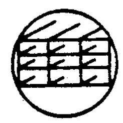
Figure 1B:
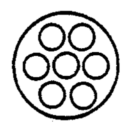

FIGS. *1a* and *1b* are enlarged regions of the dispersive wedge shown in FIG. 1 illustrating both rectangular and round waveguide channels.

Figure 2:
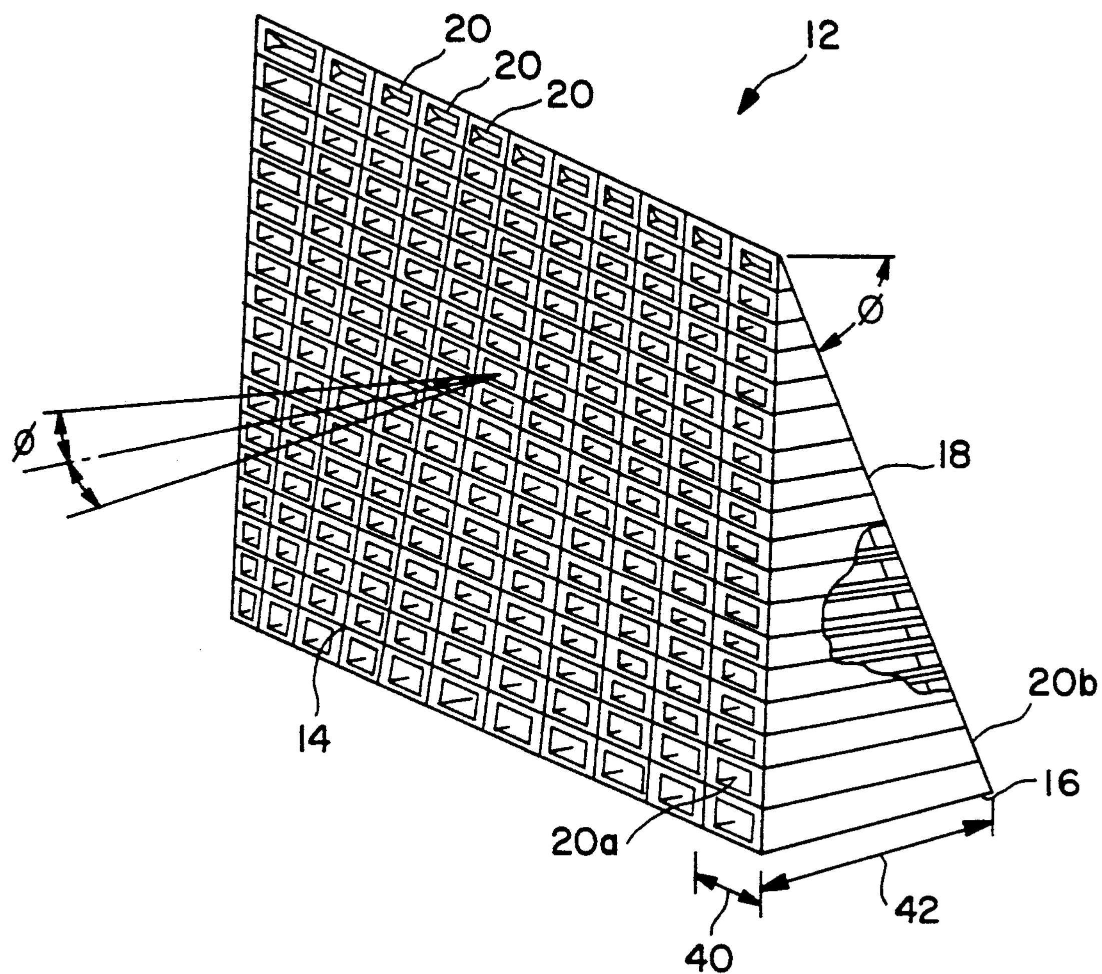

FIG. 2 is a detailed perspective view of the dispersive waveguide wedge.

Figure 3:
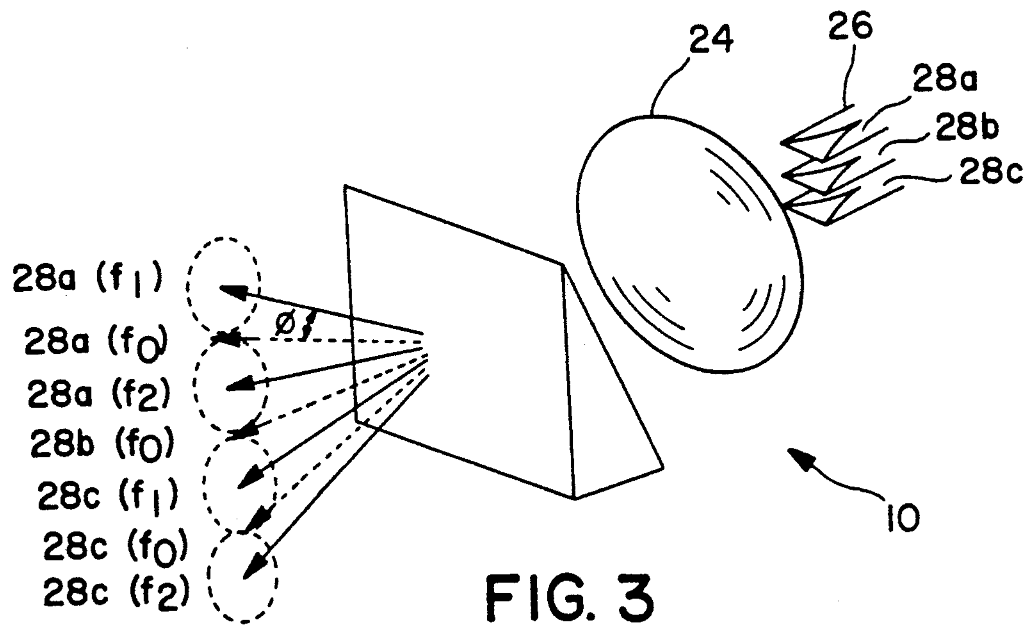

FIG. 3 is a schematic diagram similar to FIG. 1, further illustrating the one-dimensional scanning capabilities of the apparatus.

DETAILED DESCRIPTION OF A PREFERRED EMBODIMENT

With reference to the drawings, the image scanning apparatus according to the teachings of the present invention is shown generally at 10 in FIG. 1. A dispersive waveguide wedge 12, shown detailed in FIG. 2, has a face 14, a base 16 and an angled surface 18. The wedge 12 is preferably formed of a collection of waveguide channels 20 joined together with their longitudinal axes (extending through the center of the channel) aligned substantially parallel to each other and generally perpendicular to the plane defined by wedge face 14. The various lengths of the waveguide channels 20 are staggered so that they collectively form a wedge shape. Preferably each channel 20 has a first end 20*a* cut perpendicular to the longitudinal axis of the channel in order to form a substantially smooth face 14 and a second end 20*b* cut at an angle $\theta$ to form a substantially smooth angled surface 18. The channels 20 collectively form a honeycomb pattern when the wedge 12 is viewed from the face 14 or surface 18.

This dispersive wedge 12 is preferably formed with waveguide channels 20 which are rectangular in cross-section but channels of other cross-sectional shapes could also be used. Also, the waveguide channels 20 may be of a constant cross-section but are not required to be. The waveguide channels 20 are preferably made from a metallic material such as copper and may be coated with silver or gold.

Wedge 12 may alternately be fabricated by cutting a wedge shape from a suitable commercially available honeycomb sheet or by forming the channels into a solid wedge such as by drilling or boring. These alternate methods of fabrication may be advantageous especially for creating channels which are circular in cross-section.

A focusing element such as microwave lens 24 is placed between the wedge 12 and a focal plane detector array 26. Lens 24 is preferably a microwave lens of a type commonly known by those skilled in the art and is made from a soft opaque polymer material such as polystyrene or Rexolite ®, or from Teflon ®. The lens 24 acts like a wide angle camera lens taking the relatively large span of millimeter waves passing through the wedge 12 and focusing them on a smaller focal plane detector array sensor 26.

The focal plane detector array 26 consists of a plurality of linear receiver elements 28, each preferably electrically coupled to at least two local oscillators 30, 32 which have frequency varying capabilities. (However, for clarity a single linear receiver 28 is shown in FIG. 1). In addition to local oscillators 30 and 32, each linear receiver 28 also includes an antenna 34 for receiving incident millimeter wave signals, typically in the 94 GHz range of frequencies. Since it is difficult to detect at this frequency with efficiency, it is desirable to down-convert to an intermediate frequency (IF) using an electronic mixer 36 which generates sum and difference signals using the received signal from antenna 34 and those from the local oscillators. Preferably, for received signals at 94 GHz, the frequencies of local oscillators 30 and 32 would be in the range of 94 GHz±10%. Each receiver 28 and may also include at least one intermediate frequency amplifier 38 to further aid detection.

Each linear receiver 28 is preferably a printed circuit substrate having antenna 34, mixer 36 and intermediate frequency amplifier(s) 38 deposited or printed thereon by a photolithographic or other process known in the art. Each receiver 28 is used to detect microwave signals which are generated by the target, gathered through the dispersive wedge 12, and directed onto the receiver 28 by the microwave lens 24. Electrical signals output by amplifier(s) 38 in each receiver 28 can then be passed to a video display device 100 and/or a computer image memory for creating an electronic image of the target.

This arrangement makes use of the dispersive property of the wedgeshaped collection of waveguides. This dispersive property is derived from the difference in wave velocity vs. frequency in a waveguide. Similar to an optical prism, this dispersive waveguide wedge can resolve multi-spectral microwave energy from one direction into monochromatic microwave energy going to different directions. By the same token, multispectral images from various directions can be refracted into the same direction. A sensor consisting of lens 24 and focal plane array 26, placed behind the dispersive wedge 12, is thus able to detect images from different directions.

This is accomplished by varying the frequency and bandwidth selection of the receivers 28 which is done by varying the frequency applied to mixer 36 by the local oscillators 30 and 32. For a heterodyning receiver of fixed intermediate frequency bandwidth in the microwave region, this spectral selection can be performed with a variation or stepping of the local oscillator frequency applied to the receiver front end mixer 36. As the local oscillator frequency is varied, signals from different parts of the spectrum corresponding to different angles in the field of view of the imaging device are detected. The frequency of each local oscillator may be varied or applied individually.

The geometric shape of the tapered wedge results in one dimensional scanning through each waveguide channel 20, substantially along a line parallel to face 14 and extending in the direction of the taper. A scanning angle $\phi$ may be measured from the longitudinal axis of each channel 20. The magnitude of the scanning angle $\phi$ possible for two local oscillator frequencies is a function of the waveguide dimension 40 (the dimension of the longer side for rectangular waveguides and the radius for circular waveguides) as well as the thickness 42 of the base 16 of wedge 12. Table 1 below is a listing of the waveguide dimension 40 and corresponding wedge thickness 42 for a scan angle of 0.367° and local oscillator frequencies $f_1$ and $f_2$ of 92 and 96 GHz, respectively. The lens dimension used was 24 inches (61 cm).

TABLE 1

| Waveguide Dimension (cm): | Wedge thickness: | Degrees: |
|---|---|---|
| | Rectangular Waveguides | |
| .17 | 2 | 1.876282 |
| .18 | 2 | .6514816 |
| .19 | 2.1 | .3756104 |
| .2 | 3.199999 | .375824 |
| .21 | 4.399998 | .3734055 |
| .22 | 5.699996 | .37117 |
| .23 | 7.099995 | .3696976 |
| .24 | 8.599997 | .3690033 |
| .25 | 10.2 | .368988 |
| .26 | 11.90001 | .3695374 |
| .27 | 13.60002 | .3677826 |
| .28 | 15.40002 | .3670349 |
| .29 | 17.30003 | .3670731 |
| .3 | 19.30004 | .3677216 |
| .31 | 21.30005 | .3670425 |
| .32 | 23.40005 | .3670502 |
| | Circular Waveguide | |
| .102 | 2 | 1.106339 |
| .112 | 2.2 | .3727951 |
| .122 | 4.099998 | 1.3670578 |
| .132 | 6.399996 | .3689346 |
| .142 | 8.999998 | .3605139 |
| .152 | 11.80001 | .3697281 |
| .162 | 14.80002 | .3684998 |
| .172 | 18.00003 | .3674164 |
| .182 | 21.50005 | .3684769 |
| .192 | 25.10006 | .3678703 |

The one dimensional image scanning feature of the image scanner of the present invention is illustrated best in FIG. 3. As shown in the figure, the angle $\phi$ changes with the local oscillator frequency applied to the receivers 28 in the sensor array 26. Local oscillator diplexing between frequencies $f_1$ and $f_2$ allows a first receiver 28*a* and a third receiver 28*c* to collect image information which would previously have been obtained by an additional intermediate receiver 28*b* with only a fixed local oscillator frequency of $f_0$. Therefore, the number of receivers and, therefore, the number of pixels generated can be reduced by a factor of two or more depending on system design. Pixel reduction, however, is traded off against a decrease in signal integration time.

This technique provides an improved high quality image by providing image scanning or oversampling in one direction. This can facilitate the elimination of every other linear receiver, creating a wider inner linear receiver array spacing. This decreases the likelihood of overheating and allows for the use of a thicker metallic ground plane which makes conduction cooling with a circulating coolant feasible. Also, since the linear receivers are the main cost driver in the system, reducing their number makes the system less expensive. This unique scanner can provide one-dimensional electronic image scanning to all microwave imaging devices that employ heterodyne detection and a focal plane that consists of an array of linear focal plane elements. By providing image oversampling in one direction, the image quality is improved and various image enhancement techniques can be employed to improve image quality or to reduce the size of the optics.

The foregoing discussion discloses and describes merely exemplary embodiments of the present invention. One skilled in the art will readily recognize from such discussion, and from the accompanying claims, that various changes and modifications can be made therein without departing from the spirit and scope of the invention as defined in the following claims.

What is claimed is:

1. A microwave imaging apparatus adapted to create an electronic image of a specified target, said apparatus comprising:

sensing means for detecting microwave signals from a said target, said sensing means generating electronic signals in response to said microwave signals;

imaging means operatively connected to said sensing means for creating an image of said target from the electronic signals generated by said sensing means; and waveguide means disposed intermediate said sensing means and said target, said waveguide means including a plurality of waveguide channels, each said channel having a longitudinal axis and said axes of said channels being aligned substantially in parallel; whereby said microwave signals pass directly from said target through at least one of said channels before detection by said sensing means.

2. The apparatus of claim 1 wherein each said waveguide channel is rectangular or circular in cross section.

3. The apparatus of claim 1 further comprising focusing means disposed between said waveguide means and said sensing means.

4. The apparatus of claim 3 wherein said focusing means comprises a microwave lens.

5. The apparatus of claim 1 wherein said sensing means comprises at least one microwave receiver.

6. The apparatus of claim 5 wherein said sensing means comprises an array of microwave receivers and wherein each said microwave receiver further includes a microwave antenna and a mixer.

7. The apparatus of claim 6 wherein said antenna and mixer are deposited on a printed circuit substrate.

8. The apparatus of claim 6 wherein said microwave receiver further comprises at least one amplifier.

9. The apparatus of claim 6 further comprising at least one local oscillator adapted to generate a signal of a given frequency, said local oscillator signal being applied to said mixer.

10. The apparatus of claim 9 wherein said frequency of the signal generated by said local oscillator is variable.

11. The apparatus of claim 10 further comprising means for scanning in one dimension.

12. The apparatus of claim 11 wherein said means for scanning comprises varying the frequency of the signal generated by said local oscillator.

13. The apparatus of claim 1 wherein said plurality of waveguide channels vary in length so as to collectively form a wedge shape, said wedge having a face surface and a base surface and said waveguide channels being of constant cross section and having longitudinal axes aligned parallel to said base and perpendicular to said face.

14. The apparatus of claim 1 wherein said waveguide means comprises copper.

15. The apparatus of claim 14 wherein said copper is coated with gold or silver.

16. The apparatus of claim 1 wherein said plurality of waveguide channels form substantially a honeycomb pattern in cross section.

17. A microwave imaging apparatus adapted to create an electronic image of a specified target, said apparatus comprising:

a plurality of waveguide channels collectively forming a wedge shape, each said waveguide channel being of a constant cross section and having a longitudinal axis, said longitudinal axes of said plurality of waveguide channels being aligned in parallel;

an array of microwave receivers for detecting microwave signals from said target, said signals passing directly from said target through at least one of said waveguides; and a variable frequency local oscillator signal applied to each said receiver wherein scanning of said target is effected by varying said local oscillator frequency.

18. The apparatus of claim 17 further comprising a microwave lens disposed between said waveguides and said receivers, said microwave signals also passing through said lens.

* * * * *